US009217642B2

(12) United States Patent  (10) Patent No.: US 9,217,642 B2
Yamamoto  (45) Date of Patent: Dec. 22, 2015

(54) VIBRATING GYROSCOPE THAT PREVENTS CHANGES IN SENSITIVITY

(71) Applicant: Murata Manufacturing Co., Ltd., Nagaokakyo-shi, Kyoto-fu (JP)

(72) Inventor: Hironari Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 294 days.

(21) Appl. No.: 13/890,282

(22) Filed: May 9, 2013

(65) Prior Publication Data

US 2013/0239684 A1 Sep. 19, 2013

Related U.S. Application Data

(63) Continuation of application No. PCT/JP2011/078256, filed on Dec. 7, 2011.

(30) Foreign Application Priority Data

Dec. 15, 2010 (JP) ................................. 2010-279551

(51) Int. Cl.
*G01C 19/5719* (2012.01)
*G01C 19/5607* (2012.01)
(Continued)

(52) U.S. Cl.
CPC ............ *G01C 19/5783* (2013.01); *G01C 19/56* (2013.01); *G01C 19/5607* (2013.01); *G01C 19/5719* (2013.01); *G01C 19/5747* (2013.01)

(58) Field of Classification Search
CPC .......... G01C 19/5719; G01C 19/5642; G01C 19/5762; G01C 19/5747; G01C 19/5656; G01C 19/5607; G01C 19/56
USPC ................ 73/504.12, 504.14, 504.16, 504.04
See application file for complete search history.

(56) References Cited

U.S. PATENT DOCUMENTS 5,166,571 A * 11/1992 Konno et al. .................. 310/333
5,396,144 A *  3/1995 Gupta et al. ................... 310/370
(Continued)

FOREIGN PATENT DOCUMENTS

JP      06-147902 A    5/1994
JP      08-094363 A    4/1996
(Continued)

OTHER PUBLICATIONS

Official Communication issued in corresponding Japanese Patent Application No. 2012-548747, mailed on Mar. 25, 2014.
(Continued)

*Primary Examiner* — Helen Kwok
(74) *Attorney, Agent, or Firm* — Keating & Bennett, LLP

(57) ABSTRACT

A vibrating gyroscope includes a frame body, first and second exciting members, detection members that detect vibration of the frame body, a first mass adding member, a second mass adding member, a first connecting member, and a second connecting member. The frame body includes first and second vibrating portions, first and second coupling portions, a first supporting portion, and a second supporting portion. The first and second coupling portions couple the first and second vibrating portions. The first supporting portion extends towards the second coupling portion from the first coupling portion. The second supporting portion extends towards the first coupling portion from the second coupling portion. The first and second exciting members and excite the first and second vibrating portions, respectively. The first and second mass adding members are provided at outer sides of the frame body, and are connected to the first and second vibrating portions, respectively.

20 Claims, 10 Drawing Sheets

(51) Int. Cl.
*G01C 19/56* (2012.01)
*G01C 19/5783* (2012.01)
*G01C 19/5747* (2012.01)

(56) References Cited

U.S. PATENT DOCUMENTS

| | | | |
|---|---|---|---|
| 5,476,007 A | 12/1995 | Nakamura | |
| 5,763,781 A * | 6/1998 | Netzer | 73/504.16 |
| 5,889,208 A * | 3/1999 | Nose | 73/504.16 |
| 5,912,528 A | 6/1999 | Kumada | |
| 6,262,520 B1 * | 7/2001 | Knowles | 310/370 |
| 8,561,467 B2 * | 10/2013 | Kobayashi et al. | 73/504.12 |
| 2001/0001928 A1 | 5/2001 | Kikuchi et al. | |
| 2002/0157466 A1 * | 10/2002 | Terada et al. | 73/504.12 |
| 2003/0066350 A1 * | 4/2003 | Machida et al. | 73/504.15 |
| 2004/0079153 A1 | 4/2004 | Fujimoto | |
| 2005/0056095 A1 * | 3/2005 | Tomikawa et al. | 73/504.16 |
| 2005/0150297 A1 * | 7/2005 | Ayazi et al. | 73/504.16 |
| 2007/0163345 A1 | 7/2007 | Nozoe | |
| 2009/0173156 A1 * | 7/2009 | Takaoka et al. | 73/504.12 |
| 2011/0138911 A1 * | 6/2011 | Oshio | 73/504.12 |
| 2011/0162450 A1 * | 7/2011 | Oshio | 73/504.12 |

FOREIGN PATENT DOCUMENTS

| | | |
|---|---|---|
| JP | 08-219795 A | 8/1996 |
| JP | 08-278146 A | 10/1996 |
| JP | 11-281372 A | 10/1999 |
| JP | 2001-50751 A | 2/2001 |
| JP | 2002-277248 A | 9/2002 |
| JP | 2004-085361 A | 3/2004 |
| JP | 2004-144699 A | 5/2004 |
| JP | 2005-233706 A | 9/2005 |
| JP | 2006-105710 A | 4/2006 |
| JP | 2009-002907 A | 1/2009 |
| JP | 4858662 B2 | 1/2012 |

OTHER PUBLICATIONS

Official Communication issued in International Patent Application No. PCT/JP2011/078256, mailed on Feb. 7, 2012.

* cited by examiner

VIBRATING GYROSCOPE THAT PREVENTS CHANGES IN SENSITIVITY

BACKGROUND OF THE INVENTION

1. Field of the Invention

The present invention relates to a vibrating gyroscope preferably for use as an angular velocity detecting sensor. More particularly, the present invention relates to a vibrating gyroscope including a frame body in which a first vibrating portion and a second vibrating portion are provided.

2. Description of the Related Art

An angular velocity detecting sensor for detecting the position of a moving body has been widely used. An example of such an angular velocity detecting sensor is disclosed in Japanese Unexamined Patent Application Publication No. 8-278146 and shown in FIGS. 13A and 13B.

FIG. 13A is a perspective view of a known vibrating gyroscope 1001. FIG. 13B is a sectional view taken along line B-B in FIG. 13A. The vibrating gyroscope 1001 includes a vibrating body 1002 having a rectangular frame shape. In the vibrating body 1002, a pair of vibrating portions 1002a and 1002b extending in a direction of a long side of the rectangular shape are coupled to each other by a pair of coupling portions 1002c and 1002d extending in a direction of a short side of the rectangular shape.

A driving piezoelectric element 1003 and a driving piezoelectric element 1004 are secured to a top surface of the vibrating portion 1002a and a top surface of the vibrating portion 1002b, respectively. A detecting piezoelectric element 1005 and a detecting piezoelectric element 1006 are provided on an outer side surface of the vibrating portion 1002a and an outer side surface of the vibrating portion 1002b, respectively.

In the vibrating gyroscope 1001, an oscillation circuit is connected to the driving piezoelectric elements 1003 and 1004, so as to vibrate the vibrating portions 1002a and 1002b. That is, the entire vibrating body 1002 having a rectangular frame shape vibrates in a buckling tuning-fork vibration mode.

When the vibrating gyroscope 1001 is subjected to angular velocity while the vibrating body 1002 is vibrated, the vibration mode changes. An output voltage between the detecting piezoelectric elements 1005 and 1006 makes it possible to detect angular velocity of rotation based on the change in the vibration mode.

In Japanese Unexamined Patent Application Publication No. 8-278146, since nodes are positioned near respective ends of a diagonal of the vibrating body 1002 having the rectangular frame shape, the vibrating body 1002 can be supported near the respective ends of the diagonal. Consequently, it is possible to simplify a supporting structure.

In the vibrating gyroscope 1001 discussed in Japanese Unexamined Patent Application Publication No. 8-278146, the vibrating portions 1002a and 1002b undergo bending vibration. Therefore, the entire vibrating body 1002 vibrates in a buckling tuning-fork vibration mode. When such a vibrating gyroscope 1001 is reduced in size, its detection sensitivity is reduced.

When further reducing the size of the vibrating gyroscope 1001, it becomes difficult to achieve stable precision of the sizes and shapes of structural members of the vibrating gyroscope, as a result of which sensitivity changes.

SUMMARY OF INVENTION

Preferred embodiments of the present invention overcome the problems described above and provide a vibrating gyroscope that prevents changes in sensitivity from occurring using a simple structure that has a significantly reduced size.

A vibrating gyroscope according to a preferred embodiment of the present invention includes a frame body, a first exciting member, a second exciting member, detection members, a first mass adding member, a second mass adding member, a first connecting member, and a second connecting member. The frame body includes a first vibrating portion, a second vibrating portion, a first coupling portion, a second coupling portion, an opening portion, a first supporting portion, and a second supporting portion. The first and second vibrating portions are preferably disposed parallel or substantially parallel to each other so as to be spaced apart from each other and extend in a first direction. The first and second coupling portions each couple an end portion of the first vibrating portion and an end portion of the second vibrating portion to each other and extend in a second direction that is perpendicular or substantially perpendicular to the first direction. The opening portion is surrounded by the first and second vibrating portions and the first and second coupling portions. The first supporting portion extends towards the second coupling portion from the first coupling portion in the first direction. The second supporting portion extends towards the first coupling portion from the second coupling portion in the first direction. The first exciting member is provided on a surface of the first vibrating portion. The second exciting member is provided on a surface of the second vibrating portion. The first and second exciting members excite the first and second vibrating portions, respectively. The detection members are provided on corresponding surfaces of the first and second vibrating portions. The detection members detect vibration of the frame body. The first and second mass adding members are provided at outer sides of the frame body. The first and second mass adding members are connected to the first and second vibrating portions, respectively. The first connecting member connects the first vibrating portion and the first mass adding member to each other. The second connecting member connects the second vibrating portion and the second mass adding member to each other.

In a vibrating gyroscope according to a preferred embodiment of the present invention, a driving mode and a detection mode are provided. The driving mode is a mode in which the frame body vibrates in a buckling tuning-fork vibration mode by exciting the first and second vibrating portions by the first and second exciting members. The detection mode is a mode in which the frame body vibrates due to angular velocity around a third direction that is perpendicular or substantially perpendicular to the first and second directions. In addition, a vibration node in the driving mode and a vibration node in the detection mode are positioned at the first and second supporting portions.

In a vibrating gyroscope according to another preferred embodiment of the present invention, the frame member preferably has a rectangular or substantially rectangular frame shape, the first exciting member is disposed in an area of the first vibrating portion at one side of a center line passing through a center of the first vibrating portion and extending in the first direction, the second exciting member is disposed in an area of the second vibrating portion at one side of a center line passing through a center of the second vibrating portion and extending in the first direction, the detection members are disposed in areas at other sides of the center lines of the first and second vibrating portions.

In a vibrating gyroscope according to another preferred embodiment of the present invention, stress reversal portions provided when the frame body vibrates in the driving mode are provided. The stress reversal portions exist at positions where the first and second vibrating portions are divided into three equal or substantially equal portions in the first direction. In addition, the first and second exciting members are provided between the stress reversal portions.

In a vibrating gyroscope according to another preferred embodiment of the present invention, the first exciting member and the detection member or members are provided on one of a pair of principal surfaces of the first vibrating portion extending in the first and second directions, and the second exciting member and the detection member or members are provided on one of a pair of principal surfaces of the second vibrating portion extending in the first and second directions. In this case, since exciting members and detection members only need to be provided on one of the principal surfaces of the frame body, the manufacturing process of the vibrating gyroscope is simplified.

In a vibrating gyroscope according to another preferred embodiment of the present invention, the first and second exciting members each preferably include a piezoelectric body and a pair of electrodes arranged to apply voltage to the piezoelectric body. In this case, by the piezoelectric effect, the frame body including the first and second vibrating portions is efficiently vibrated in a buckling tuning-fork vibration mode.

In a vibrating gyroscope according to another preferred embodiment of the present invention, the detection members each preferably include a piezoelectric body and a pair of electrodes that are provided on the piezoelectric body so as to extract electric charge generated at the piezoelectric body. In this case, by the piezoelectric effect, it is possible to extract, as electrical vibration, angular velocity, to which the vibrating gyroscope is subjected, based on a change in the vibration mode of the frame body.

In a vibrating gyroscope according to another preferred embodiment of the present invention, the first and second mass adding members each preferably have a rectangular or substantially rectangular plate shape. In this case, the first mass adding member and the second mass adding member having a simple rectangular or substantially rectangular plate shape only needs to be connected to corresponding sides of the frame body. Therefore, the vibrating gyroscope can be easily manufactured. In particular, when the frame body, the first and second mass adding members, and the first and second connecting members are integrally made using the same material, the manufacturing process is further simplified.

The vibrating gyroscope according to various preferred embodiments of the present invention includes the first mass adding member and the second mass adding member that are disposed at outer sides of the frame body and that are connected to the first vibrating portion and the second vibrating portion, respectively; the first connecting member that connects the first vibrating portion and the first mass adding member to each other; and the second connecting member that connects the second vibrating portion and the second mass adding portion to each other. Therefore, a reduction in sensitivity of the vibrating gyroscope is prevented even if the size thereof is further reduced. Consequently, a small vibrating gyroscope having high sensitivity is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will be made apparent by describing specific preferred embodiments of the present invention with reference to the drawings.

Figure 1:
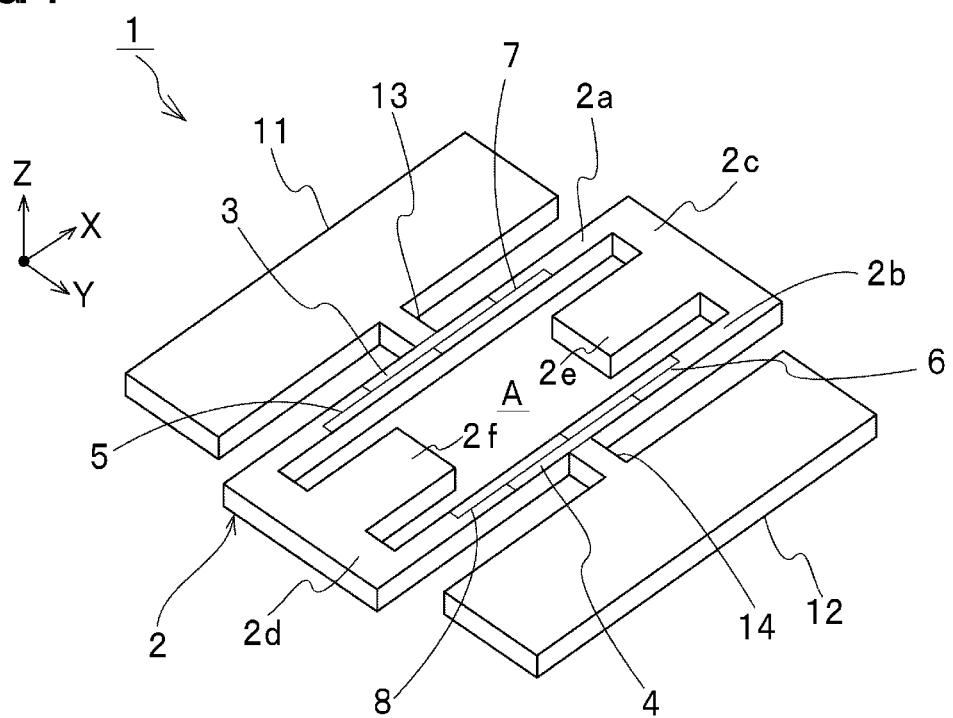
FIG. 1 is a perspective view of a vibrating gyroscope according to a first preferred embodiment of the present invention.
Figure 2A:
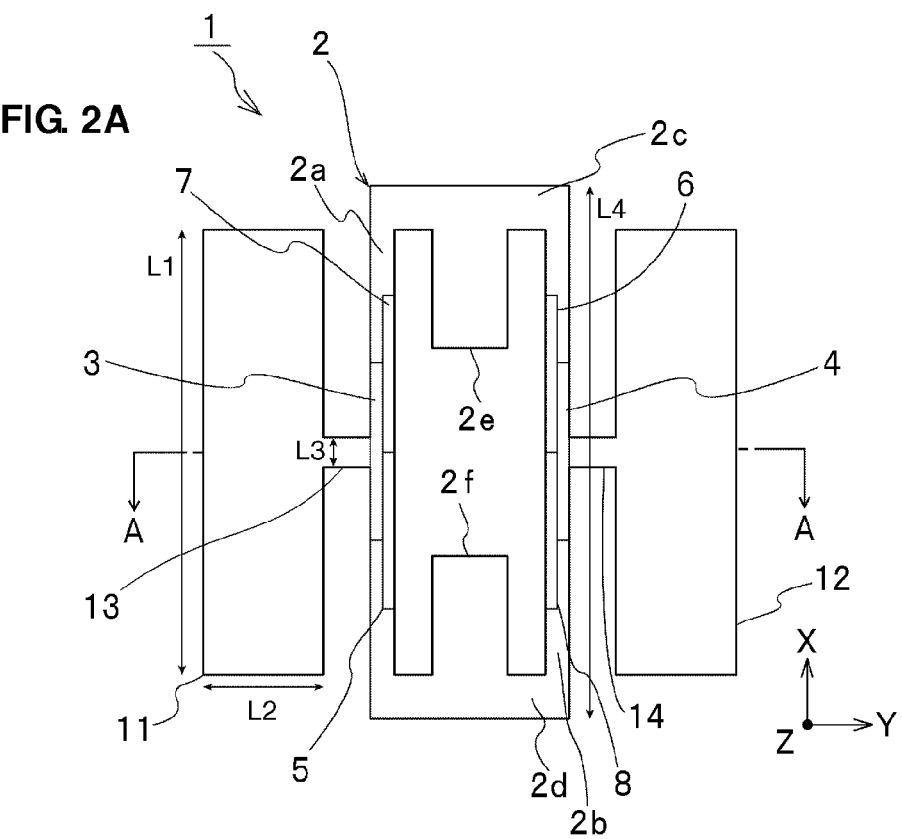
FIG. 2A is a plan view of the vibrating gyroscope according to the first preferred embodiment of the present invention.
Figure 2B:
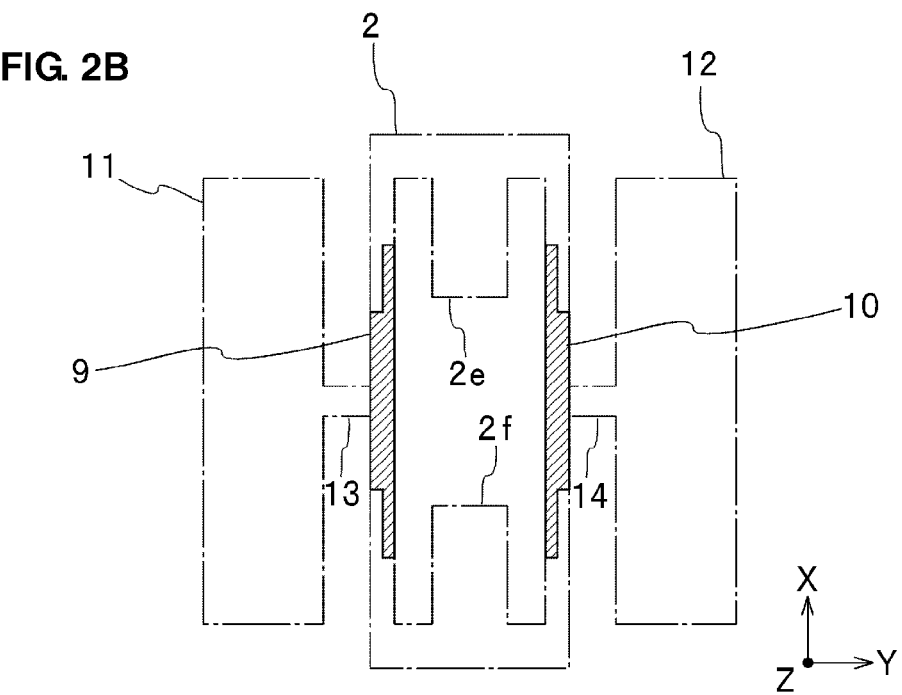
FIG. 2B is a schematic plan view of an electrode configuration at a lower surface of the vibrating gyroscope according to the first preferred embodiment of the present invention.
Figure 3A:
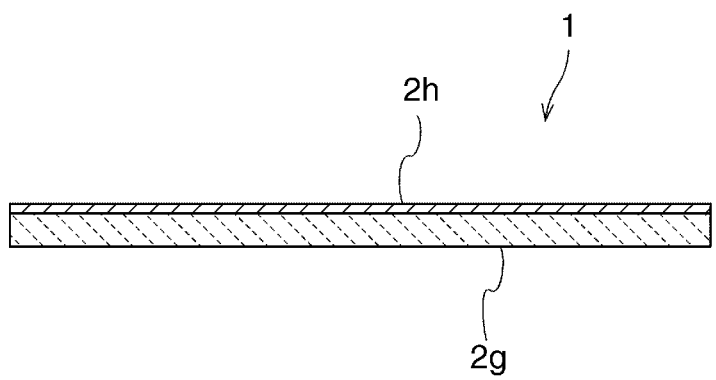
FIG. 3A is a sectional view of a portion that corresponds to a portion taken along line A-A in FIG. 2A of the vibrating gyroscope according to the first preferred embodiment of the present invention without showing an electrode structure.

FIG. 1 is a perspective view of a vibrating gyroscope according to a first preferred embodiment of the present invention. In FIG. 1, an X axis, a Y axis, and a Z axis of an orthogonal coordinate system are shown. Here, an X-axis direction corresponds to a first direction, a Y-axis direction that is orthogonal to the X axis corresponds to a second direction, and a Z-axis direction that is orthogonal to the X axis and the Y axis corresponds to a third direction. FIG. 2A is a plan view of the vibrating gyroscope 1 according to the first preferred embodiment of the present invention. FIG. 2B is a schematic plan view of an electrode configuration at a lower surface of the vibrating gyroscope 1 according to the first preferred embodiment of the present invention. FIG. 2B is a perspective plan view of the vibrating gyroscope 1 when viewed from above the vibrating gyroscope 1. FIG. 3A is a sectional view of a portion that corresponds to a portion taken along line A-A in FIG. 2A of the vibrating gyroscope 1 according to the first preferred embodiment of the present invention without showing an electrode structure.

The vibrating gyroscope 1 includes a frame body 2. In the first preferred embodiment, the frame body 2 preferably has a rectangular or substantially rectangular frame shape. The frame body 2 includes a first vibrating portion 2a, a second vibrating portion 2b, a first coupling portion 2c, and a second coupling portion 2d. The first vibrating portion 2a and the second vibrating portion 2b are preferably strips that extend in the X-axis direction shown in FIG. 1. That is, the first vibrating portion 2a and the second vibrating portion 2b each preferably have a quadrangular or substantially quadrangular prism shape.

An end of the first vibrating portion 2a and an end of the second vibrating portion 2b are coupled to each other by the first coupling portion 2c extending in the Y-axis direction that is orthogonal to the X-axis direction. Similarly, the other end of the first vibrating portion 2a and the other end of the second vibrating portion 2b are coupled to each other by the second coupling portion 2d extending in the Y-axis direction. Therefore, the frame body 2 having a rectangular or substantially rectangular opening portion A is provided. In the first preferred embodiment, the first vibrating portion 2a, the second vibrating portion 2b, the first coupling portion 2c, and the second coupling portion 2d are integrally provided.

In the first preferred embodiment, the first vibrating portion 2a and the second vibrating portion 2b each preferably have a quadrangular or substantially quadrangular prism shape extending in the X-axis direction. The first coupling portion 2c and the second coupling portion 2d each preferably have a quadrangular or substantially quadrangular prism shape extending in the Y-axis direction. However, as long as the first vibrating portion 2a and the second vibrating portion 2b are line-symmetrical with respect a center line passing through the center of the frame body 2 and extending in the X-axis direction, the shape of each of the first vibrating portion 2a and the second vibrating portion 2b may deviate slightly from a strip line on a straight line. In addition, as long as the first coupling portion 2c and the second coupling portion 2d are line-symmetrical with respect to a center line passing through the center of the frame body 2 and extending in the Y-axis direction, the shape of each of the first coupling portion 2c and the second coupling portion 2d may deviate slightly from a strip line on a straight line. Therefore, the frame body 2 may preferably have a rectangular or substantially rectangular frame shape.

A first supporting portion 2e is provided at a top surface of the first vibrating portion 2a and a top portion of the second vibrating portion 2b so as to extend towards the second coupling portion 2d from the first coupling portion 2c. Similarly, a second supporting portion 2f is provided at the top surface of the first vibrating portion 2a and the top surface of the second vibrating portion 2b so as to extend towards the first coupling portion 2c from the second coupling portion 2d.

The first and second supporting portions 2e and 2f are portions arranged to secure the vibrating gyroscope 1 to an outside portion. That is, using the first and second supporting portions 2e and 2f, the vibrating gyroscope 1 is supported by an outside member. In the first preferred embodiment, as described below, vibration nodes in a driving mode and in a detection mode are positioned at the first supporting portion 2e and the second supporting portion 2f. Therefore, the vibrating gyroscope 1 is supported without preventing vibrations in the driving mode or in the detection mode.

In the first preferred embodiment, the first supporting portion 2e preferably has a tongue shape that extends towards the center of the opening portion A from an opening-portion-A-side edge of the first coupling portion 2c, and the second supporting portion 2f preferably has a tongue shape that extends towards the center of the opening portion A from an opening-portion-A-side edge of the second coupling portion 2d. In the first preferred embodiment, planar shapes of the first and second supporting portions 2e and 2f are preferably rectangular or substantially rectangular shapes. However, the shapes of the first and second supporting portions 2e and 2f are not particularly limited to rectangular or substantially rectangular shapes.

A first mass adding portion 11 is connected to the first vibrating portion 2a of the frame body 2 by a first connecting portion 13. A second mass adding portion 12 is connected to the second vibrating portion 2b of the frame body 2 by a second connecting portion 14. In the first preferred embodiment, planar shapes of the first and second mass adding portions 11 and 12 are preferably rectangular or substantially rectangular shapes each of whose X-axis direction corresponds to a long-side direction and Y-axis direction corresponds to a short-side direction. Here, the length of each of the first and second mass adding portions 11 and 12 in the X-axis direction (long side) is L1, and the length of each of the first and second mass adding portions 11 and 12 in the Y-axis direction (short side) is L2. The direction in which each of the first and second connecting portions 13 and 14 extends corresponds to the Y-axis direction. If the length of each of the first and second connecting portions 13 and 14 in the X-axis direction, that is, the width thereof is L3, L3 is preferably less than the length of each of the first and second connecting portions 13 and 14 in the Y-axis direction. If the length of the frame body 2 in the X-axis direction (long side) is L4, L3 is preferably less than L1 and L4. That is, the first and second mass adding portions 11 and 12 are connected to the frame body 2 by the corresponding first and second connecting portions 13 and 14 which define a bridge.

In the first preferred embodiment, the frame body 2, the first and second mass adding portions 11 and 12, and the first and second connecting portions 13 and 14 preferably are integrally provided so as to be defined by a unitary monolithic member. As shown in FIG. 3A, such a structure may be obtained by depositing a piezoelectric film 2h on a silicon substrate, 2g and, then, subjecting this to, for example, wet etching, reactive ion etching, or sandblasting. The piezoelectric film 2h may be formed on the silicon substrate 2g by, for example, a thin-film formation method (such as sputtering), a method in which firing is performed after printing of a piezoelectric material paste, or a method in which, after bonding bulk piezoelectric ceramics to a silicon substrate, grinding of the piezoelectric ceramics is performed to make thin the piezoelectric ceramics. The piezoelectric film 2h may be made of, for example, lead zirconate titanate, or an alkali niobate piezoelectric material such as potassium sodium niobate, or a combination of such piezoelectric materials as appropriate. The processing into a planar shape shown in FIG.

2A may be performed not only by wet etching, reactive ion etching, or sandblasting, but also by machining, such as punching. In another preferred embodiment of the present invention, it is possible to form the silicon substrate 2g out of a piezoelectric crystal substance or sintered body that is formed into the shape of a frame body, and dispose electrodes on the front and back surfaces of the frame body. Examples of piezoelectric crystal substances are $LiTaO_3$, $LiNbO_3$, and quartz. In the case of $LiTaO_3$ and $LiNbO_3$, a 128-degree Y-cut crystal substance is preferably used, and in the case of quartz, an X plate or a Z plate is preferably used. Ordinarily, in the case of quartz, a Z plate is preferably used because it has good frequency temperature characteristics. However, in preferred embodiments of the present invention, the difference between the frequency in the driving mode and the frequency in the detection mode only needs to be capable of being detected. Therefore, since the piezoelectric orientation in the driving mode and that in the detection mode are the same or substantially the same, the difference between the frequency temperature characteristics can be cancelled out. Consequently, an X plate may also be used. A detection electrode needs to be provided on a side surface of a Z plate made of quartz. However, if an X plate is used, a manufacturing process thereof may be shared with piezoelectric ceramics used for electrodes provided on the front and back sides of a frame body. Therefore, productivity is excellent.

First and second driving electrodes 3 and 4 are provided on the top surfaces of the corresponding first and second vibrating portions 2a and 2b. The first and second driving electrodes 3 and 4 are disposed on outer edges of the top surfaces of the corresponding first and second vibrating portions 2a and 2b, the outer edges being provided on sides of the top surfaces opposite to the opening portion A. In the first preferred embodiment, the first driving electrode 3 is provided on the top surface of the first vibrating portion 2a so as to be arranged in an area at an outer side (the side opposite to the opening portion A) of a center line passing through the center of the first vibrating portion 2a and extending in the X-axis direction. Similarly, the second driving electrode 4 is provided on the top surface of the second vibrating portion 2b so as to be arranged in an area at an outer side (the side opposite to the opening portion A) of a center line passing through the center of the second vibrating portion 2b and extending in the X-axis direction.

The first and second driving electrodes 3 and 4 are disposed in the centers or approximate centers of the corresponding first and second vibrating portions 2a and 2b in the lengthwise direction, that is, the X-axis direction. In other words, the first and second driving electrodes 3 and 4 are arranged so that their shapes are symmetrical with respect to corresponding center lines passing through the centers of the top surfaces of the first and second vibrating portions 2a and 2b and extending in the Y-axis direction.

First and second detection electrodes 5 and 7 are provided on the top surface of the first vibrating portion 2a. The first and second detection electrodes 5 and 7 are provided on the top surface of the first vibrating portion 2a so as to be arranged in an area at an inner side (the side of the opening portion A) of the center line passing through the center of the first vibrating portion 2a and extending in the X-axis direction. The first detection electrode 5 is provided on one side of the center line passing through the center of the top surface of the first vibrating portion 2a and extending in the Y-axis direction. The second detection electrode 7 is provided on the other side of the center line. The first and second detection electrodes 5 and 7 preferably have strip shapes, and are arranged so as to be line-symmetrical with respect to the center line passing through the center of the top surface of the first vibrating portion 2a and extending in the Y-axis direction.

Similarly, first and second detection electrodes 6 and 8 are provided on the top surface of the second vibrating portion 2b. The first and second detection electrodes 6 and 8 have the same or substantially the same structures as the first and second detection electrodes 5 and 7 on the first vibrating portion 2a. However, the first and second detection electrodes 6 and 8 are disposed opposite to the first and second detection electrodes 5 and 7 in the X-axis direction. That is, the first detection electrode 6 is disposed at the side of the first coupling portion 2c and the second detection electrode 8 is disposed at the side of the second coupling portion 2d.

The first and second detection electrodes 5 and 7 and the first driving electrode 3 are arranged so that the first and second detection electrodes 5 and 7 are electrically isolated from the first driving electrode 3 on the top surface of the first vibrating portion 2a. Similarly, the first and second detection electrodes 6 and 8 are electrically isolated from the second driving electrode 4 on the top surface of the second vibrating portion 2b. However, the first and second detection electrodes 5 and 7 and the first and second detection electrodes 6 and 8 are also used during driving.

Further, as shown in FIG. 2B, a common electrode 9 is provided on a lower surface of the first vibrating portion 2a. The common electrode 9 is preferably configured such that the back side of each of the first driving electrode 3, the first detection electrode 5, and the second detection electrode 7 oppose the front side of the common electrode 9.

Similarly, a common electrode 10 is provided on a lower surface of the second vibrating portion 2b. The common electrode 10 is configured such that the back side of each of the second driving electrode 4, the first detection electrode 6, and the second detection electrode 8 oppose the front side of the common electrode 10.

Although, in the first preferred embodiment, the common electrodes 9 and 10 are preferably independently provided, the common electrodes 9 and 10 may be integrally provided as a monolithic unitary member. That is, one common electrode may be provided so as to oppose all of the first and second driving electrodes 3 and 4, the first and second detection electrodes 5 and 7, and the first and detection electrodes 6 and 8. In this case, the common electrode may be provided over the entire or substantially the entire lower surface of the frame body 2. Further, the common electrode may be configured so as to also extend to lower surfaces of the first and second mass adding portions 11 and 12 and the first and second connecting portions 13 and 14 that are integrally provided with the frame body 2.

Figure 3B:
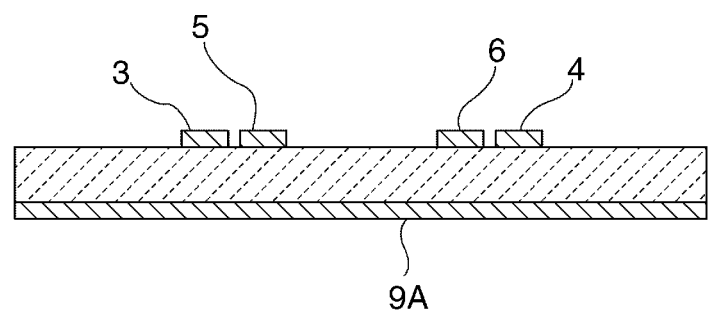
FIG. 3B is a sectional view of a vibrating gyroscope according to a modification of the first preferred embodiment of the present invention, in which a portion that corresponds to a portion taken along line A-A in FIG. 2A is shown.

FIG. 3B is a sectional view of a vibrating gyroscope according to a modification of the first preferred embodiment of the present invention, in which a portion that corresponds to a portion taken along line A-A in FIG. 2A is shown. As shown in FIG. 3B, one common electrode 9A may be provided over the entire or substantially the entire lower surface of the structure shown in FIG. 2A.

The common electrode may be arranged so that its front side opposes the back sides of at least the driving electrodes and the detection electrodes.

The first and second driving electrodes 3 and 4, the first and second detection electrodes 5 to 8, and the common electrodes 9 and 10 are preferably made of an appropriate metal, such as Ag or Cu, or an appropriate alloy thereof, for example.

Figure 4A:
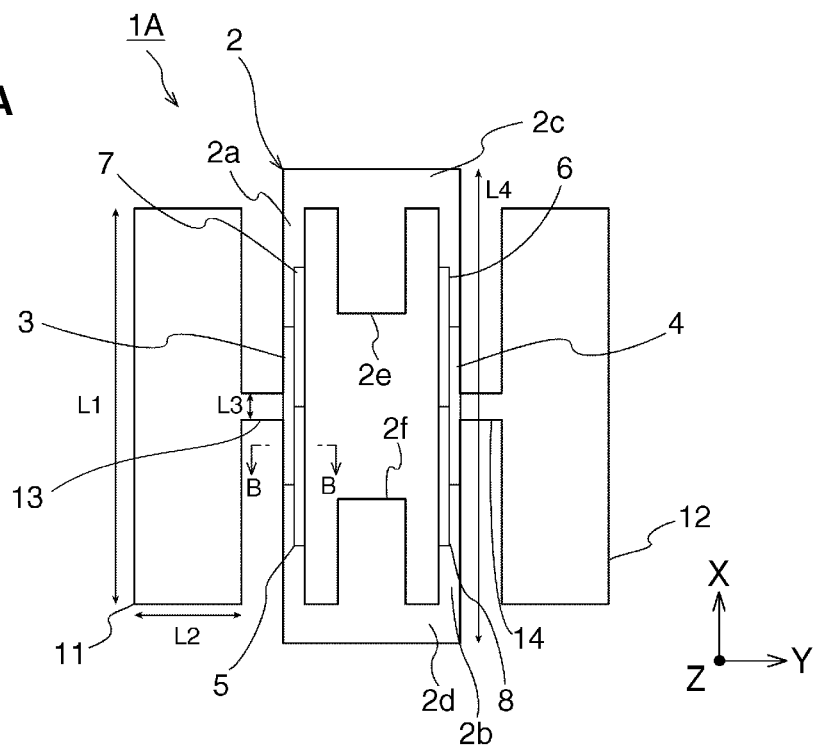
FIG. 4A is a plan view of a vibrating gyroscope according to another modification of the first preferred embodiment of the present invention.

FIG. 4A is a schematic plan view of a vibrating gyroscope 1A according to another modification of the first preferred embodiment. FIG. 4A corresponds to FIG. 2A, and corresponding portions are given the same reference numerals. Modifications shown in FIGS. 4B to 4D are described with a portion taken along line B-B in FIG. 4A being a representative portion.

Figure 4B:
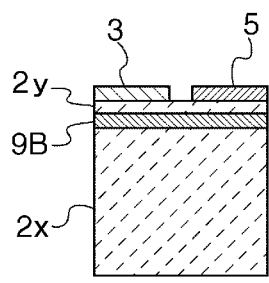
FIGS. 4B to 4D are each a sectional view of an exemplary structure of a portion taken along line B-B in FIG. 4A.

As shown in FIG. 4B, it is possible to provide a common electrode 9B and a piezoelectric layer 2y upon a frame body 2x, made of a non-piezoelectric substrate material, and provide the first driving electrode 3 and the first detection electrode 5 on the piezoelectric layer 2y.

Figure 4C:
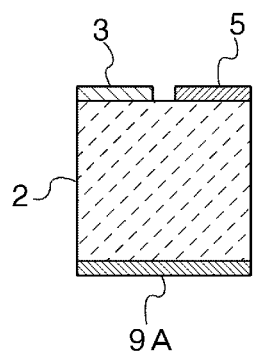

FIG. 4C corresponds to the structure shown in FIG. 3B above. The common electrode 9A preferably is provided on the lower surface of the frame body 2 made of a piezoelectric material, and the first driving electrode 3 and the first detection electrode 5 are provided on the top surface of the frame body 2.

Figure 4D:
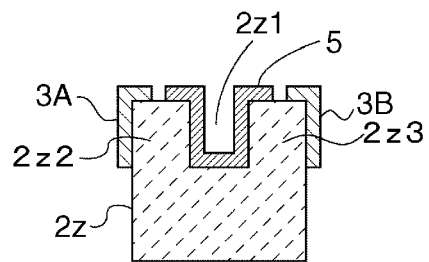

As shown in FIG. 4D, a groove 2z1 may preferably be provided in a top surface of a frame body 2z made of a piezoelectric material. Here, the first detection electrode 5 is configured so as to extend to the top surface of the frame body 2z from a bottom surface and both side walls defining the groove 2z1. In addition, a first driving electrode 3A is preferably configured so as to extend from a top surface of one of piezoelectric-plate portions, that is, a piezoelectric-plate portion 2z2, which is separated by the groove 2z1, to an outer side surface of the piezoelectric-plate portion 2z2. Similarly, a first driving electrode 3B is preferably configured so as to extend from a top surface of the other piezoelectric-plate portion 2z3, which is separated by the groove 2z1, to an outer side surface of the piezoelectric-plate portion 2z3. In this case, for the frame body 2z, piezoelectric ceramics whose polarization direction is a planar direction of the frame body 2, or Z-plate quartz may preferably be used, for example.

As shown in FIGS. 4B to 4D, in preferred embodiments of the present invention, various structures may be provided for the piezoelectric vibrating members defining exciting members.

In using the vibrating gyroscope 1 according to the first preferred embodiment, an alternating electric field is applied between the first and second driving electrodes 3 and 4 and the second common electrodes 9 and 10. As a result, the first and second vibrating portions 2a and 2b vibrate in a bending mode, so that the entire frame body 2 vibrates in a buckling tuning-fork vibration mode. That is, the vibration mode when the frame body 2 is vibrating due to the excitation of the first and second vibrating portions 2a and 2b corresponds to a driving mode.

Accordingly, in the vibrating gyroscope 1, when the vibrating gyroscope 1 is subjected to angular velocity around the Z axis in a state in which the frame body 2 is vibrating in the driving mode, the frame body 2 vibrates in a vibration mode that differs from the driving mode due to Coriolis force. The vibration mode at this time is a detection mode. When the frame body 2 is vibrating in the detection mode, outputs that are in accordance with the magnitude of the angular velocity to which the vibrating gyroscope 1 is subjected are extracted from the first detection electrodes 5 and 6 and the second detection electrodes 7 and 8.

Figure 5A:
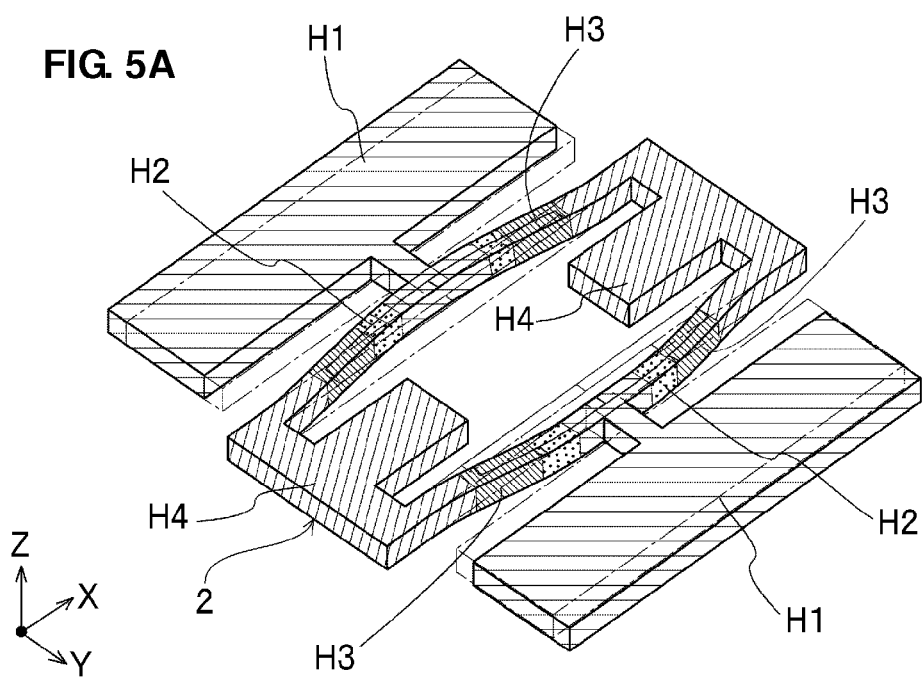
FIGS. 5A and 5B are schematic perspective views of vibration modes when the vibrating gyroscope according to the first preferred embodiment of the present invention is in a driving mode and in a detection mode, respectively.

FIG. 5A is schematic perspective view of a vibration mode when the vibrating gyroscope 1 according to the first preferred embodiment of the present invention is in a driving mode. Portions indicated by hatched areas H1 to H4 in FIG. 5A indicate the following.

Hatched areas H1: areas where displacement is largest
Hatched areas H2: area where displacement is less than that of the hatched areas H1
Hatched areas H3: areas where displacement is less than that of the hatched areas H2
Hatched areas H4: areas where displacement is zero or almost zero Preferably, the amounts of displacement are: hatched areas H1>hatched areas H2>hatched areas H3>hatched areas H4.

Figure 5B:
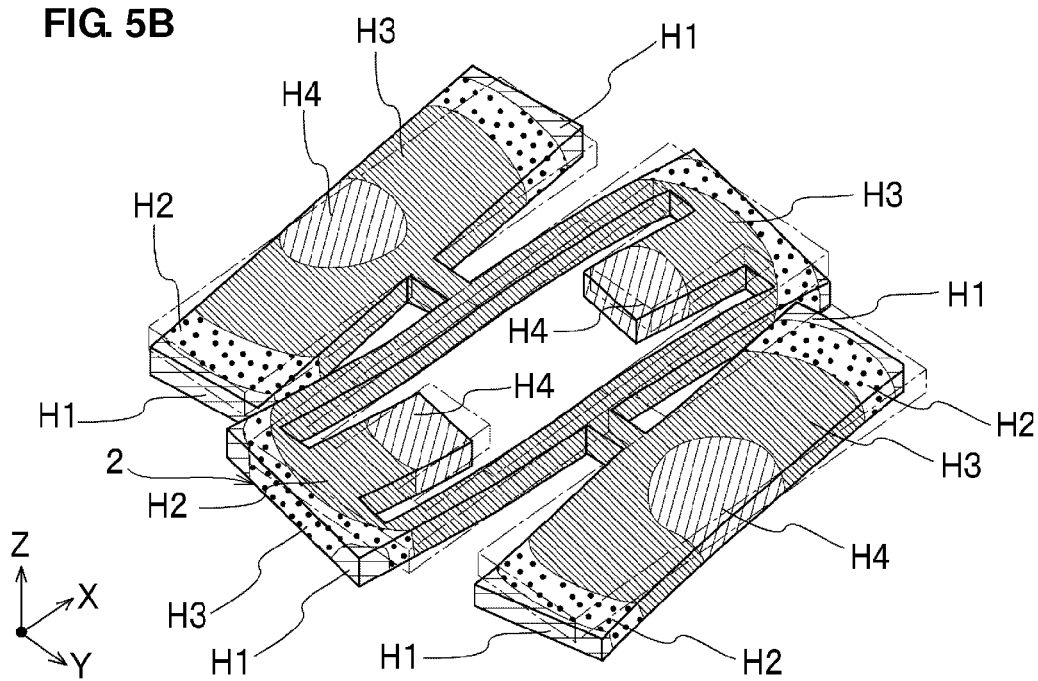

FIG. 5B is a schematic perspective view of a vibration mode when the vibrating gyroscope 1 according to the first preferred embodiment of the present invention is in a detection mode. Portions indicated by hatched areas H1 to H4 in FIG. 5B indicate the same thing as the portions shown in FIG. 5A.

As shown in FIG. 5A, in the driving mode, the frame body 2 vibrates in the buckling tuning-fork vibration mode. When the mode changes to the detection mode as a result of the vibrating gyroscope 1 being subjected to angular velocity, the vibration mode changes in accordance with the direction and magnitude of the angular velocity as shown in FIG. 5B.

In either case, in the first preferred embodiment, as shown in FIGS. 5A and 5B, the hatched areas H4, which are areas in which the displacement is zero or almost zero, are positioned in the second supporting portions 2e and 2f, respectively. Therefore, in the vibrating gyroscope 1 according to the first preferred embodiment, the first and second supporting portions 2e and 2f can be bonded to an outside portion, and support the vibrating gyroscope 1 without substantially influencing the vibration mode of the vibrating gyroscope 1.

Figure 6A:
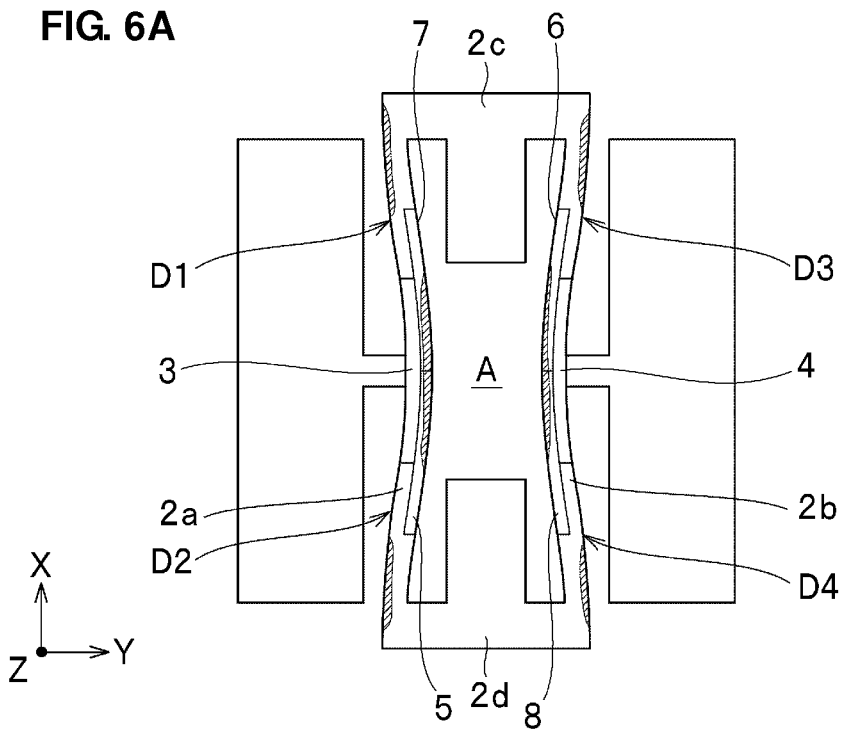
FIGS. 6A and 6B are, respectively, a schematic plan view of stress distribution when the vibrating gyroscope according to the first preferred embodiment of the present invention is in the driving mode and a schematic plan view of stress distribution when the vibrating gyroscope according to the first preferred embodiment of the present invention is in the detection mode, with the stress distributions being measured by a finite element method.
Figure 6B:
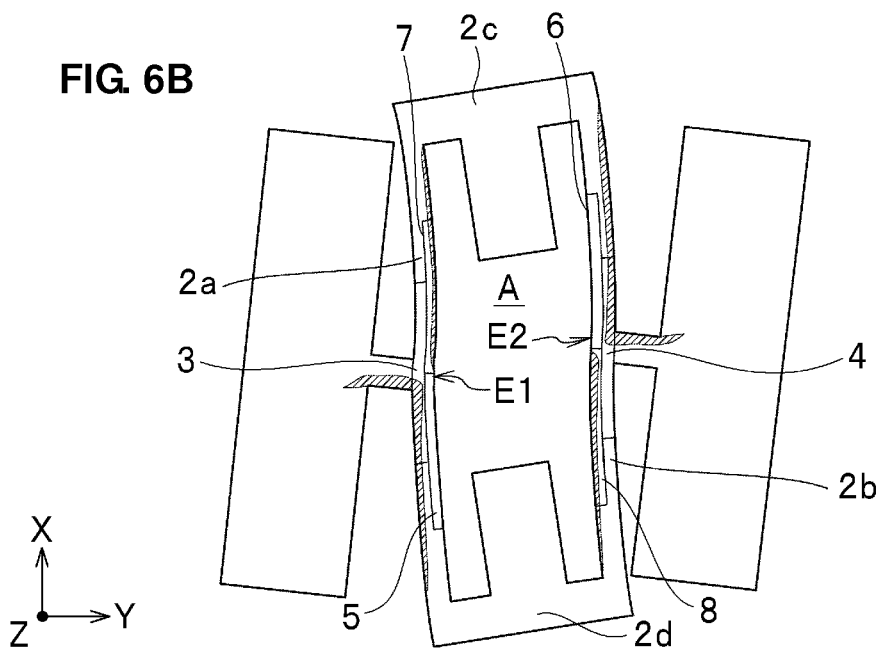

FIG. 6A is a schematic plan view of stress distribution when the vibrating gyroscope 1 according to the first preferred embodiment of the present invention is in the driving mode, and FIG. 6B is a schematic plan view of stress distribution when the vibrating gyroscope 1 according to the first preferred embodiment of the present invention is in the detection mode, with the stress distributions being measured by a finite element method.

Arrows D1 to D4 in FIG. 6A indicate stress reversal portions during the driving mode, and arrows E1 and E2 in FIG. 6B indicate stress reversal portions during the detection mode. The stress reversal portions correspond to positions at which the directions of stresses between both sides of the frame body are opposite each other when vibration occurs between the two vibration modes.

In FIGS. 6A and 6B, only portions of the first and second vibrating portions 2a and 2b at which tensile stress is applied are hatched by oblique lines. As shown in FIG. 6A, when the vibration mode is the driving mode, the first vibrating portion 2a is such that tensile stress is generated in an opening-portion-A-side area of a lengthwise-direction central portion of the first vibrating portion 2a and areas of the first vibrating portion 2a at a side opposite to the opening portion A near both lengthwise-direction ends of the first vibrating portion 2a. Therefore, the portions indicated by the arrows D1 and D2 are stress reversal portions. Similarly, when the vibration mode is the driving mode, the second vibrating portion 2b is such that tensile stress is generated in an opening-portion-A-side area of a lengthwise-direction central portion of the second vibrating portion 2b and areas of the second vibrating portion 2b at a side opposite to the opening portion A near both lengthwise-direction ends of the second vibrating portion 2b. Therefore, the portions indicated by the arrows D3 and D4 are stress reversal portions.

As shown in FIG. 6A, in the driving mode, in the first vibrating portion 2a, the stress reversal portions D1 and D2 exist at positions at which the first vibrating portion 2a is divided into three equal or substantially equal portions in the lengthwise direction, that is, the X-axis direction of the first vibrating portion 2a. Similarly, in the driving mode, even in the second vibrating portion 2b, the stress reversal portions D3 and D4 exist at positions at which the second vibrating portion 2b is divided into three equal or substantially equal portions in the lengthwise direction, that is, the X-axis direction of the second vibrating portion 2b.

As shown in FIG. 6B, when the vibration mode is the detection mode, the first vibrating portion 2a is such that tensile stress is generated in an opening-portion-A-side area of the first vibrating portion 2a extending from the lengthwise-direction central portion of the first vibrating portion 2a to a location near an end portion of the first vibrating portion 2a at the side of the first coupling portion 2c and an area of the first vibrating portion 2a disposed at the side opposite to the opening portion A and extending from the lengthwise-direction central portion of the first vibrating portion 2a to a location near an end portion of the first vibrating portion 2a at the side of the second coupling portion 2d. Therefore, the portion indicated by the arrow E1 is a stress reversal portion. Similarly, when the vibration mode is the detection mode, the second vibrating portion 2b is such that tensile stress is generated in an opening-portion-A-side area of the second vibrating portion 2b extending from of the lengthwise-direction central portion of the second vibrating portion 2b to a location near an end portion of the second vibrating portion 2b at the side of the second coupling portion 2d and an area of the second vibrating portion 2b disposed at the side opposite to the opening portion A and extending from the lengthwise-direction central portion of the second vibrating portion 2b to a location near an end portion of the second vibrating portion 2b at the side of the first coupling portion 2c. Therefore, the portion indicated by the arrow E2 is a stress reversal portion. As shown in FIG. 6B, in the detection mode, the stress reversal portions E1 and E2 exist at the centers or approximate centers of the corresponding first and second vibrating portions 2a and 2b in the lengthwise direction, that is, the X-axis direction of the first and second vibrating portions 2a and 2b.

Therefore, in the first preferred embodiment, the first driving electrode 3 is positioned between the stress reversal portions D1 and D2 in the driving mode. The second driving electrode 4 is positioned between the stress reversal portions D3 and D4 in the driving mode.

The stress reversal portion E1 in the detection mode is positioned in the center or approximate center of the first vibrating portion 2a in the lengthwise direction thereof. Therefore, the first detection electrode 5 is preferably arranged to extend from the lengthwise-direction central portion of the first vibrating portion 2a to a location that is adjacent to the second coupling portion 2d, and the second detection electrode 7 is provided so as to be positioned from the lengthwise-direction central portion of the first vibrating portion 2a to a location that is adjacent to the first coupling portion 2c. Similarly, even in the second vibrating portion 2b, the stress reversal portion E2 in the detection mode is positioned in the center or approximate center of the second vibrating portion 2b in the lengthwise direction thereof. Therefore, the first detection electrode 6 is preferably arranged to extend from the lengthwise-direction central portion of the second vibrating portion 2b to a location that is at the side of the first coupling portion 2c, and the second detection electrode 8 is preferably arranged to extend from the lengthwise-direction central portion of the second vibrating portion 2b to a location that is at the side of the second coupling portion 2d.

The first and second detection electrodes 5 and 7 and first and second detection electrodes 6 and 8 are preferably positioned so as to be point-symmetrical with respect to the center of the opening portion A.

According to the first preferred embodiment, the first and second mass adding portions 11 and 12 are preferably provided at the outer sides of the frame body 2 by the corresponding first and second connecting portions 13 and 14, and the first and second supporting portions 2e and 2f are preferably provided in the opening portion A in the frame body 2.

As described above, if the size of a known vibrating gyroscope including a vibrating body having a rectangular or substantially rectangular frame shape and utilizing a buckling tuning-fork vibration mode is further reduced, the resonance frequency is increased, and the detection sensitivity is reduced.

In contrast, in the vibrating gyroscope 1 according to the first preferred embodiment, the first and second mass adding portions 11 and 12 are connected to the frame body 2 by the corresponding first and second connecting portions 13 and 14. Therefore, even if the size is further reduced by mass addition action of the first and second mass adding portions 11 and 12, changes do not readily occur.

Therefore, the resonance frequency is reduced. Consequently, a reduction in sensitivity caused by an increase in the resonance frequency is prevented.

In the vibrating gyroscope 1 according to the first preferred embodiment, vibration nodes in the driving mode and the detection mode exist at the first and second supporting portions 2e and 2f. Therefore, it is possible to support the vibrating gyroscope 1 by the first and second supporting portions 2e and 2f as portions that are connected to an outside portion. Even in this case, since the vibrating gyroscope 1 is supported at the vibration nodes, leakage and suppression of vibration do not readily occur. Therefore, angular velocity is stably detected with high sensitivity using the vibrating gyroscope 1.

An angular velocity detection operation using the vibrating gyroscope 1 will now be described.

As shown in FIG. 5A, in the driving mode, the frame body 2 vibrates in the buckling tuning-fork vibration mode. Here, when the vibrating gyroscope 1 is subjected to angular velocity around the thickness direction, that is, the Z-axis direction of the frame body 2, Coriolis force acts upon the frame body 2 and the first and second mass adding portions 11 and 12. The first and second mass adding portions 11 and 1 are pulled perpendicularly or substantially perpendicularly to a vibration direction in the driving mode and in opposite directions to each other. Therefore, the vibration in the detection mode shown in FIG. 5B is induced. In this case, electric charges are generated at the first detection electrodes 5 and 6 and the second detection electrodes 7 and 8 so as to be opposite to each other. From this difference, an output in accordance with the angular velocity is obtained.

As described above, in the vibrating gyroscope 1 according to the first preferred embodiment, it is possible to reduce resonance frequency even if the size is further reduced by providing the first and second mass adding portions 11 and 12. Therefore, a reduction in sensitivity is prevented. In addition, since the first and second supporting portions 2e and 2f are preferably arranged so that vibration nodes are positioned in both the driving mode and the detection mode, a reduction in sensitivity is more effectively prevented. Moreover, when the vibrating gyroscope 1 is mechanically supported by the first and second supporting portions 2e and 2f, leakage and suppression of vibration do not readily occur. Thus, reduction in detection sensitivity is even more effectively prevented. Further, angular velocity is stably detected.

Figure 7:
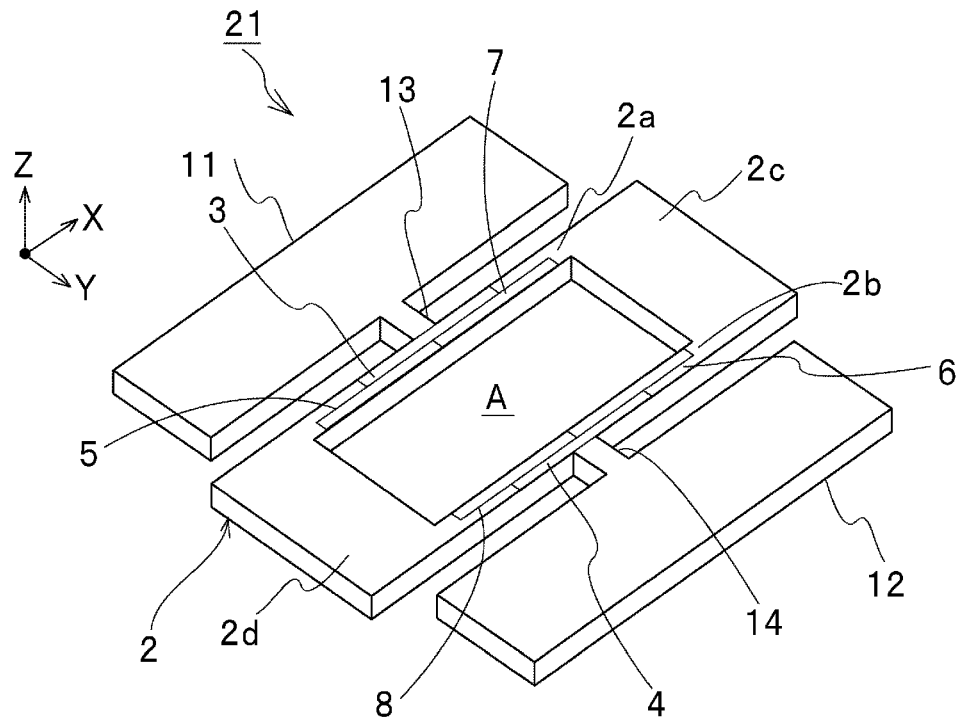
FIG. 7 is a perspective view of a vibrating gyroscope according to a second preferred embodiment of the present invention.
Figure 8:
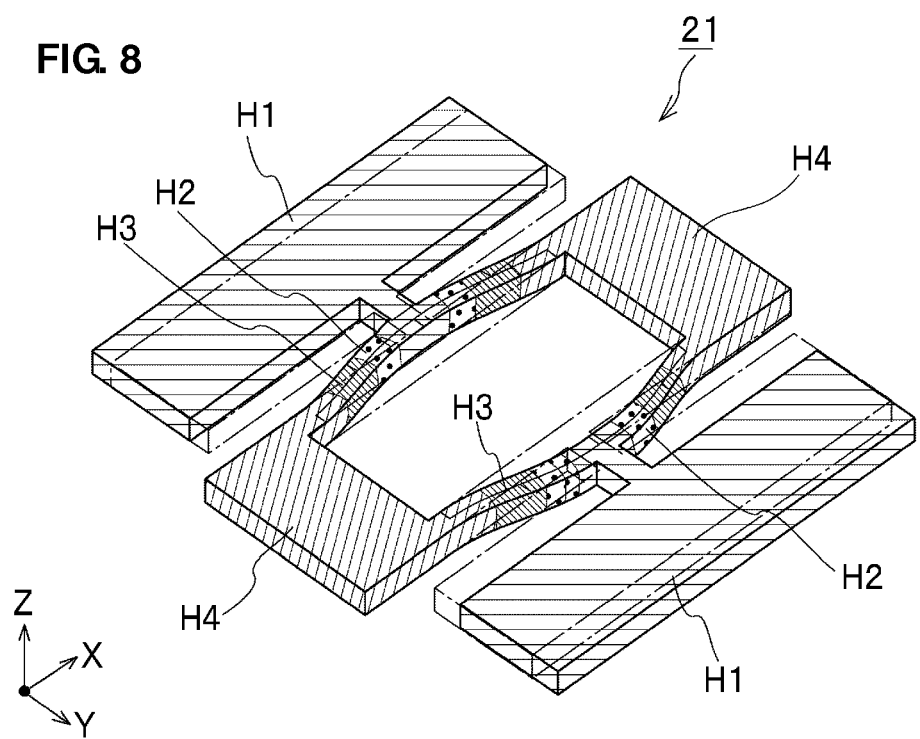
FIG. 8 is a schematic perspective view showing a vibration mode when the vibrating gyroscope according to the second preferred embodiment of the present invention is in a driving mode.
Figure 9:
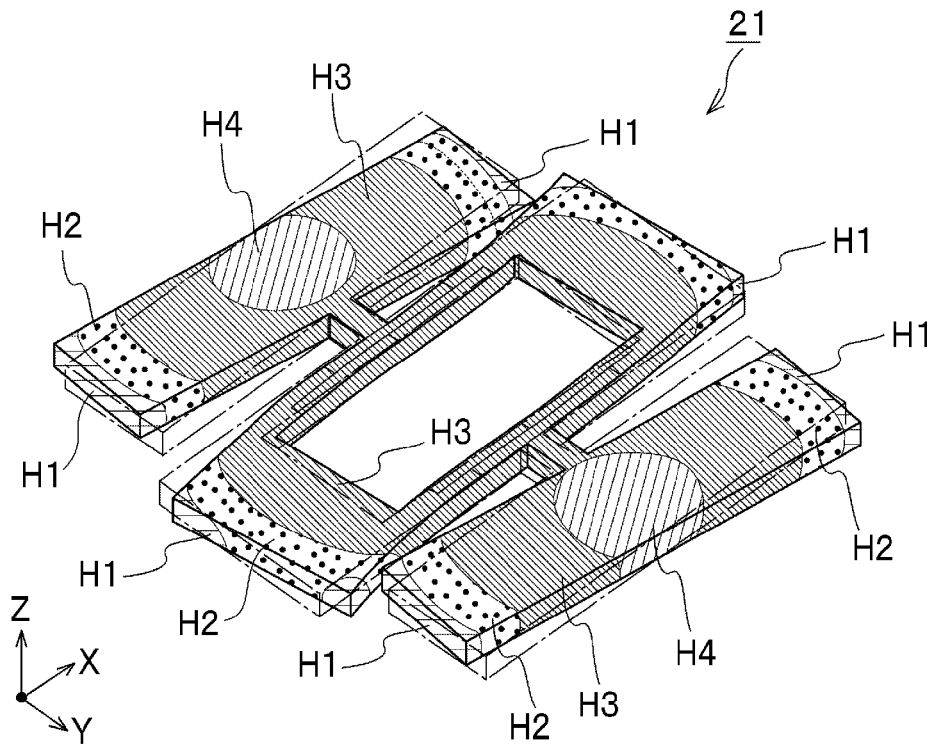
FIG. 9 is a schematic perspective view showing a vibration mode when the vibrating gyroscope according to the second preferred embodiment of the present invention is in a detection mode.

FIGS. 7 to 9 each show a vibrating gyroscope 21 according to a second preferred embodiment of the present invention. FIG. 7 is a perspective view of the vibrating gyroscope 21 according to the second preferred embodiment of the present invention. FIG. 8 is a schematic perspective view showing a vibration mode when the vibrating gyroscope 21 according to the second preferred embodiment of the present invention is in the driving mode. FIG. 9 is a schematic perspective view showing a vibration mode when the vibrating gyroscope 21 according to the second preferred embodiment of the present invention is in the detection mode.

Hatched areas H1 to H4 shown in FIGS. 8 and 9 indicate the same thing as the hatched areas H1 to H4 shown in FIGS. 5A and 5B.

The vibrating gyroscope 21 according to the second preferred embodiment preferably has the same or substantially the same structure as that according to the first preferred embodiment, except that first and second supporting portions 2e and 2f are not provided. The same reference numerals are provided for the corresponding portions and descriptions thereof are omitted.

In the vibrating gyroscope 21 according to the second preferred embodiment, first and second mass adding portions 11 and 12 are connected to a frame body 2 by first and second connecting portions 13 and 14. Therefore, even if the size is further reduced, an increase in resonance frequency is prevented or the resonance frequency is reduced. Consequently, even if the size is further reduced as in the first preferred embodiment, angular velocity is detected with high sensitivity.

As shown in FIGS. 8 and 9, in the driving mode and the detection mode, nodes at which there is almost no vibration, that is, vibration nodes do not readily appear at common positions. Therefore, the vibrating gyroscope 1 according to the first preferred embodiment is preferable as compared to the vibrating gyroscope 21 according to the second preferred embodiment.

Figure 10:
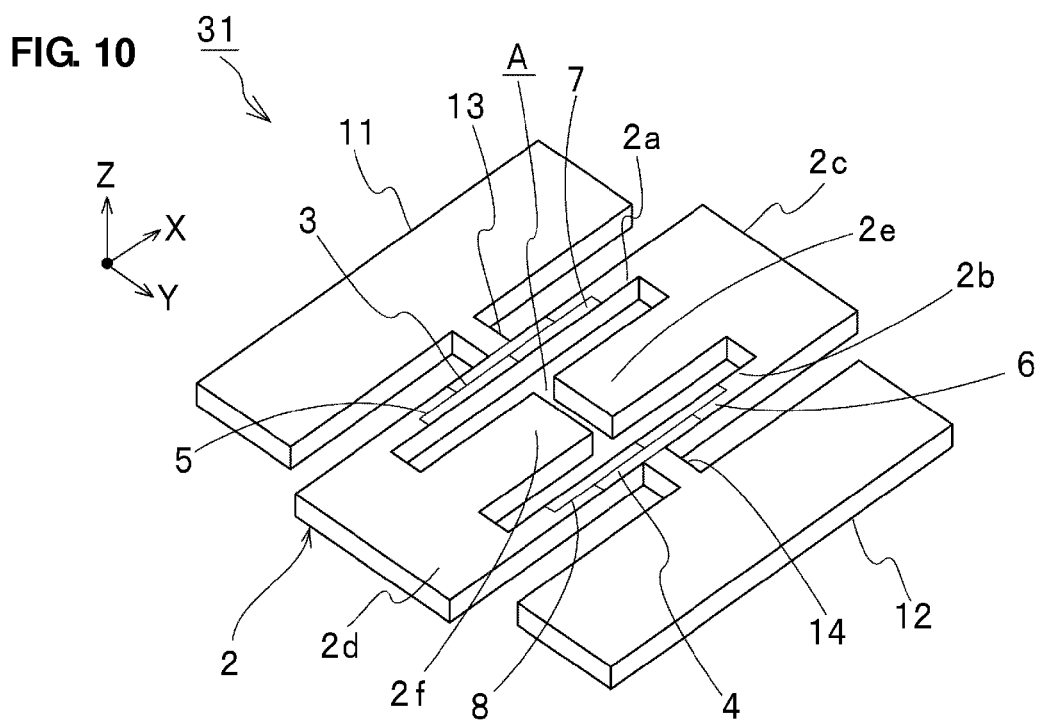
FIG. 10 is a perspective view of a vibrating gyroscope according to a third preferred embodiment of the present invention.
Figure 11:
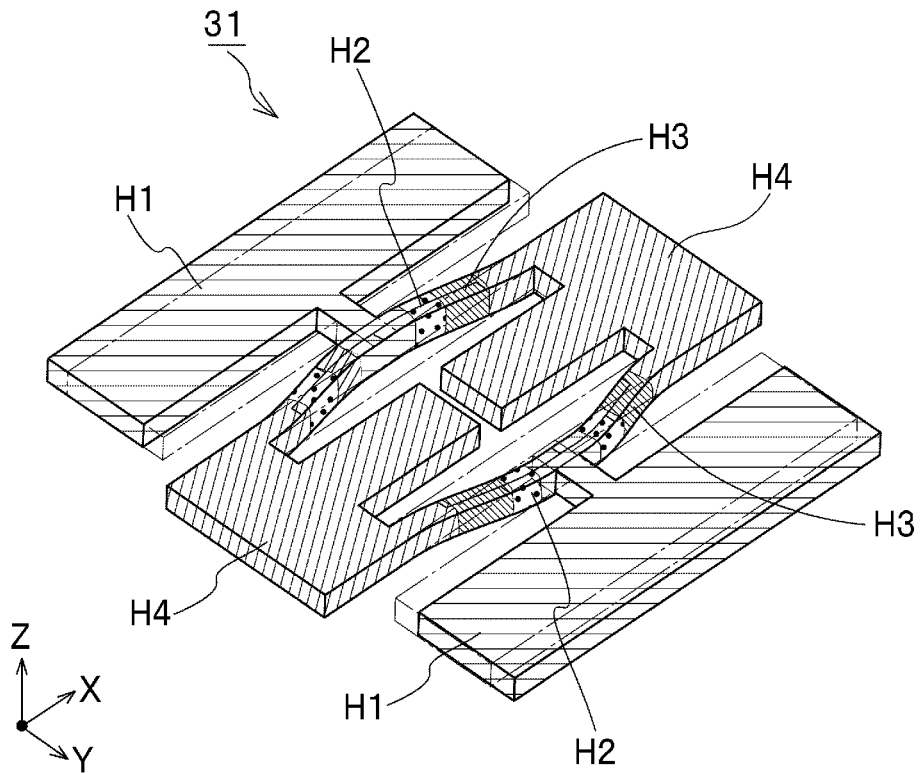
FIG. 11 is a schematic perspective view showing a vibration mode when the vibrating gyroscope according to the third preferred embodiment of the present invention is in a driving mode.
Figure 12:
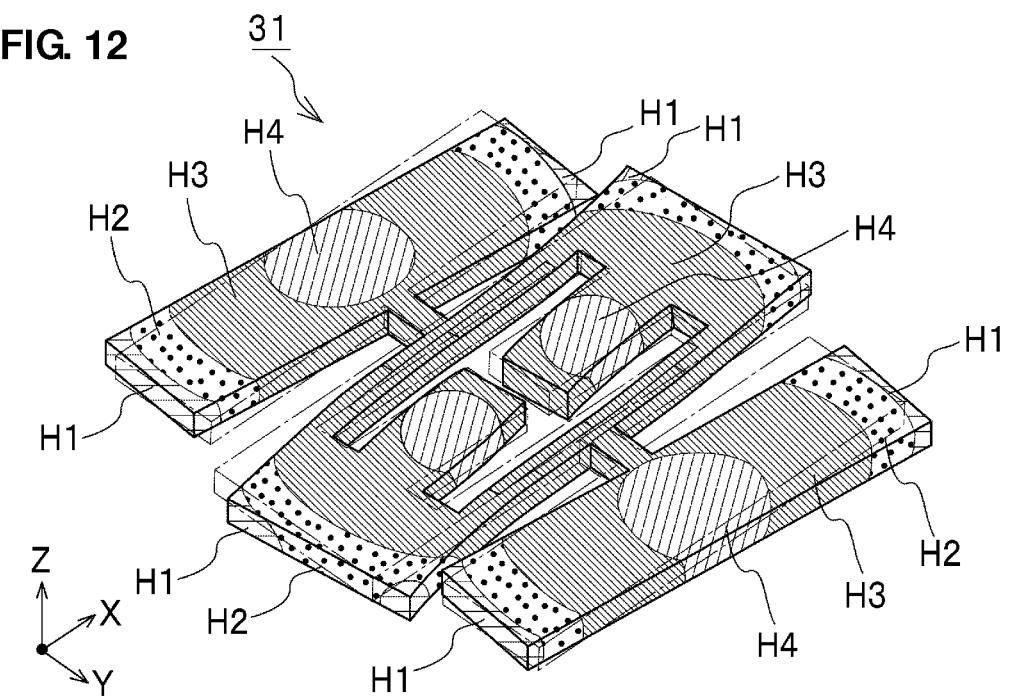
FIG. 12 is a schematic perspective view showing a vibration mode when the vibrating gyroscope according to the third preferred embodiment of the present invention is in a detection mode.
Figure 13A:
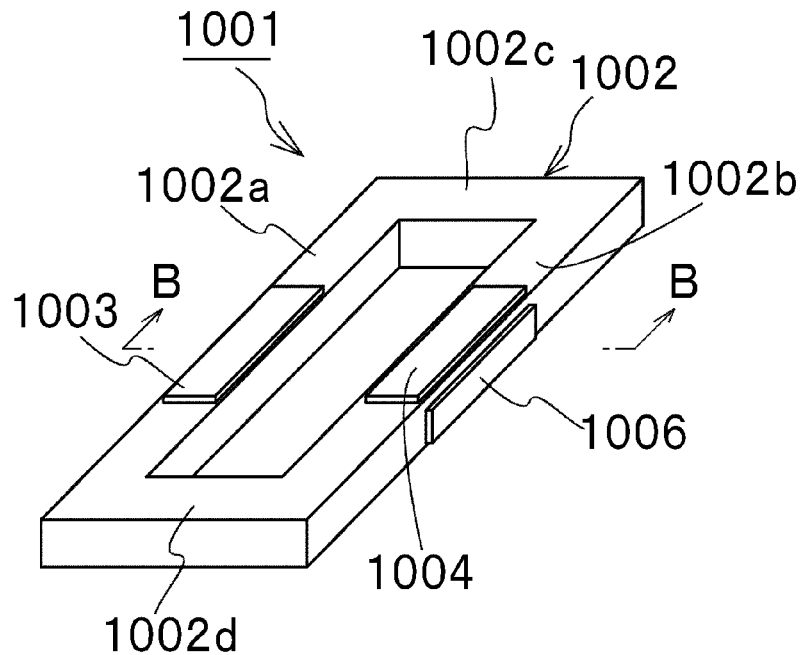
FIG. 13A is a perspective view of a known vibrating gyroscope.
Figure 13B:
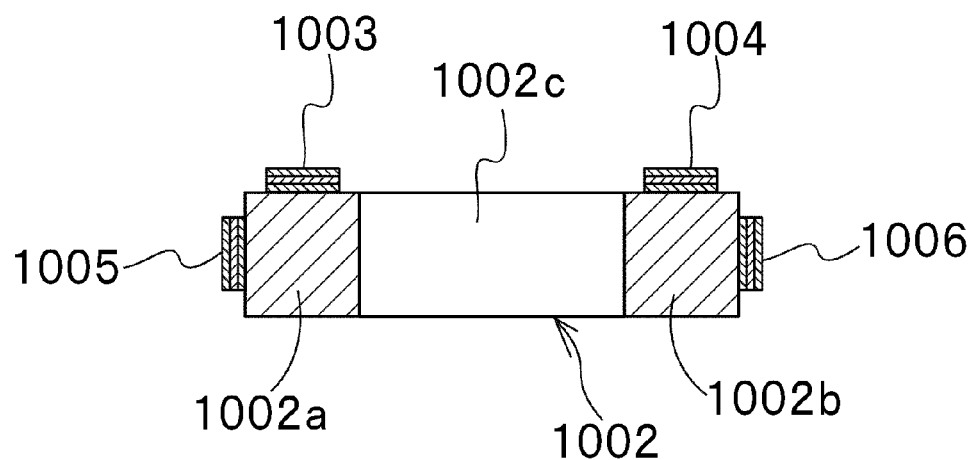
FIG. 13B is a sectional view taken along line B-B in FIG. 13A.

FIGS. 10 to 12 each show a vibrating gyroscope 31 according to a third preferred embodiment of the present invention. FIG. 10 is a perspective view of the vibrating gyroscope 31 according to the third preferred embodiment of the present invention. FIG. 11 is a schematic perspective view showing a vibration mode when the vibrating gyroscope 31 according to the third preferred embodiment of the present invention is in the driving mode. FIG. 12 is a schematic perspective view showing a vibration mode when the vibrating gyroscope 31 according to the third preferred embodiment of the present invention is in the detection mode.

Hatched areas H1 to H4 shown in FIGS. 11 and 12 indicate the same thing as the hatched areas H1 to H4 shown in FIGS. 5A and 5B.

The vibrating gyroscope 31 according to the third preferred embodiment preferably has the same or substantially the same structure as that according to the first preferred embodiment, except that the lengths of first and second supporting portions 2e and 2f in the X-axis direction and the lengths of first and second coupling portions 2c and 2d in the X-axis direction (widths) differ from those in the first preferred embodiment. Therefore, the description of the first preferred embodiment is referred to by giving the same reference numerals to corresponding portions. Consequently, descriptions of the corresponding portions are omitted.

In the vibrating gyroscope 31 according to the third preferred embodiment, the lengths of the first and second supporting portions 2e and 2f in the X-axis direction and the lengths of the first and second coupling portions 2c and 2d in the X-axis direction (widths) are greater than those in the vibrating gyroscope 1 according to the first preferred embodiment. More specifically, for example, the widths of the first and second coupling portions 2c and 2d are preferably about 0.2 mm, the lengths and widths of the first and second supporting portions 2e and 2f are preferably about 1.4 mm and about 0.5 mm, respectively. Accordingly, even if the widths of the first and second coupling portions 2c and 2d and the shapes of the first and second supporting portions 2e and 2f are changed in this manner, FIGS. 11 and 12 clearly show that the hatched areas H4, that is, vibration nodes at which there is almost no displacement are positioned on the first and second supporting portions 2e and 2f. Therefore, in the third preferred embodiment, as in the first preferred embodiment, it is possible to mechanically support the vibrating gyroscope 31 by using the first and second supporting portions 2e and 2f and bonding them to an outside portion. Since leakage and suppression of vibration do not easily occur, even in the third preferred embodiment, angular velocity is detected with high sensitivity.

In addition, in the third preferred embodiment, first and second mass adding portions 11 and 12 are preferably provided. Therefore, even if the size is further reduced, an increase in resonance frequency is prevented, or the resonance frequency is reduced. Consequently, angular velocity is detected with high sensitivity.

Although, in the above-described preferred embodiments, the piezoelectric film 2h is preferably provided on the silicon substrate 2g, it is possible to use a structure in which the frame body 2 is made of a metallic plate, and piezoelectric elements are disposed on portions on the frame body 2 corresponding to locations at which the first and second driving electrodes and the first and second detection electrodes are provided. That is, piezoelectric element portions arranged to vibrate the frame body 2 by piezoelectric effect and to extract and detect electric charge, provided by the vibration of the frame body 2, may be defined by piezoelectric elements that are separate from the frame body 2. In this case, the piezoelectric elements only need to be defined by placing a common electrode, a piezoelectric layer, and a detection electrode or a driving electrode upon each other on a top surface of, for example, a metallic plate defining the frame body 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating gyroscope comprising:
    a frame body including a first vibrating portion, a second vibrating portion, a first coupling portion, a second coupling portion, an opening portion, a first supporting portion, and a second supporting portion, the first and second vibrating portions being disposed parallel or substantially parallel to each other so as to be spaced apart from each other and extending in a first direction, the first and second coupling portions each coupling an end portion of the first vibrating portion and an end portion of the second vibrating portion to each other and extending in a second direction that is perpendicular or substantially perpendicular to the first direction, the opening portion being surrounded by the first and second vibrating portions and the first and second coupling portions, the first supporting portion extending towards the second coupling portion from the first coupling portion in the first direction, the second supporting portion extending towards the first coupling portion from the second coupling portion in the first direction;
    a first exciting member and a second exciting member, the first exciting member being provided on a surface of the first vibrating portion, the second exciting member being provided on a surface of the second vibrating portion, the first and second exciting members exciting the first and second vibrating portions, respectively;

detection members provided on corresponding surfaces of the first and second vibrating portions, the detection members being arranged to detect vibration of the frame body;

a first mass adding member and a second mass adding member provided at outer sides of the frame body, the first and second mass adding members being connected to the first and second vibrating portions, respectively; and a first connecting member and a second connecting member, the first connecting member connecting the first vibrating portion and the first mass adding member to each other, the second connecting member connecting the second vibrating portion and the second mass adding member to each other.

2. The vibrating gyroscope according to claim 1, wherein the vibrating gyroscope operates in a driving mode and a detection mode, the driving mode being a mode in which the frame body vibrates in a buckling tuning-fork vibration mode by exciting the first and second vibrating portions by the first and second exciting members, the detection mode being a mode in which the frame body vibrates due to angular velocity around a third direction that is perpendicular to the first and second directions; and a vibration node in the driving mode and a vibration node in the detection mode exist at the first and second supporting portions, respectively.

3. The vibrating gyroscope according to claim 2, wherein the frame body has a rectangular or a substantially rectangular frame shape;

the first exciting member is disposed in an area of the first vibrating portion at one side of a center line passing through a center of the first vibrating portion and extending in the first direction;

the second exciting member is disposed in an area of the second vibrating portion at one side of a center line passing through a center of the second vibrating portion and extending in the first direction; and the detection members are disposed in areas at other sides of the center lines of the first and second vibrating portions.

4. The vibrating gyroscope according to claim 3, wherein stress reversal portions provided when the frame body vibrates in the driving mode are provided, the stress reversal portions existing at positions at which the first and second vibrating portions are divided into three equal or substantially equal portions in the first direction; and the first and second exciting members are provided between the stress reversal portions.

5. The vibrating gyroscope according to claim 1, wherein the first exciting member and at least one of the detection members are provided on one of a pair of principal surfaces of the first vibrating portion extending in the first and second directions; and the second exciting member and at least another one of the detection members are provided on one of a pair of principal surfaces of the second vibrating portion extending in the first and second directions.

6. The vibrating gyroscope according to claim 1, wherein each of the first and second exciting members includes a piezoelectric body and a pair of electrodes arranged to apply voltage to the piezoelectric body.

7. The vibrating gyroscope according to claim 1, wherein each of the detection members includes a piezoelectric body and a pair of electrodes that are provided at the piezoelectric body so as to extract electric charge generated at the piezoelectric body.

8. The vibrating gyroscope according to claim 1, wherein each of the first and second mass adding members has a rectangular or substantially rectangular plate shape.

9. The vibrating gyroscope according to claim 1, wherein the frame body, the first and second connecting members, and the first and second mass adding members are integrally defined and made of a same material.

10. The vibrating gyroscope according to claim 1, wherein each of the first and second vibrating portions has a quadrangular or substantially quadrangular prism shape.

11. The vibrating gyroscope according to claim 1, wherein each of the first and second coupling portions has a quadrangular or substantially quadrangular prism shape.

12. The vibrating gyroscope according to claim 1, wherein each of the first and second supporting portions has a tongue shape.

13. The vibrating gyroscope according to claim 1, wherein each of the first and second supporting portions has a rectangular or substantially rectangular planar shape.

14. The vibrating gyroscope according to claim 1, wherein a length of each of the frame body in the first direction is greater than a length of each of the first and second mass adding members in the first direction.

15. The vibrating gyroscope according to claim 1, wherein a length of the each of the first and second connecting members in the first direction is less than a length of each of the first and second connecting members in the second direction.

16. The vibrating gyroscope according to claim 1, wherein a length of each of the first and second connecting members in the first direction is less than a length of each of the first and second mass adding members in the first direction and a length of the frame body in the first direction.

17. The vibrating gyroscope according to claim 6, wherein the piezoelectric body includes a piezoelectric film disposed on a silicon wafer.

18. The vibrating gyroscope according to claim 7, wherein the piezoelectric body includes a piezoelectric film disposed on a silicon wafer.

19. The vibrating gyroscope according to claim 17, wherein the piezoelectric film is made of at least one of lead zirconate titanate and an alkali niobate piezoelectric material.

20. The vibrating gyroscope according to claim 18, wherein the piezoelectric film is made of at least one of lead zirconate titanate and an alkali niobate piezoelectric material.

* * * * *